(12) United States Patent
Marple et al.

(10) Patent No.: US 10,963,796 B1
(45) Date of Patent: Mar. 30, 2021

(54) SYSTEM AND METHOD FOR IMPLEMENTING AN ASSESSMENT TOOL

(71) Applicant: JPMorgan Chase Bank, N.A., NY, NY (US)

(72) Inventors: Darin Ryan Marple, Katy, TX (US);
Herb D. Blatt, League City, TX (US);
Celena Cross, New York, NY (US);
Agim Perolli, Carmel, NY (US);
Marina Levin, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 673 days.

(21) Appl. No.: 15/288,285

(22) Filed: Oct. 7, 2016

(51) Int. Cl.
*G06Q 40/02* (2012.01)
*G06N 5/02* (2006.01)

(52) U.S. Cl.
CPC ............ *G06N 5/025* (2013.01); *G06Q 40/02* (2013.01)

(58) Field of Classification Search
CPC ........... G06N 5/025; G06N 5/02; G06Q 40/02
See application file for complete search history.

(56) References Cited

U.S. PATENT DOCUMENTS

| | | | |
|---|---|---|---|
| 7,672,884 B2* | 3/2010 | Schuster | G06Q 10/0639 705/35 |
| 8,504,412 B1* | 8/2013 | Zeng | G06Q 10/10 705/7.36 |
| 8,655,827 B2* | 2/2014 | Pearson | G06N 5/04 706/48 |
| 2003/0101086 A1* | 5/2003 | San Miguel | G06Q 10/06311 705/7.13 |
| 2005/0228685 A1* | 10/2005 | Schuster | G06Q 10/0639 705/317 |
| 2005/0288994 A1* | 12/2005 | Haunschild | G06Q 10/06 705/7.41 |
| 2008/0262863 A1* | 10/2008 | Stickley | G06F 21/577 705/1.1 |
| 2008/0281768 A1* | 11/2008 | Sadeh | G06Q 10/10 706/47 |
| 2009/0089195 A1* | 4/2009 | Salomon | G06Q 10/10 705/35 |
| 2009/0132557 A1* | 5/2009 | Cohen | G06Q 10/10 |
| 2013/0218853 A1* | 8/2013 | Bullis | H04L 41/0816 707/694 |
| 2014/0129457 A1* | 5/2014 | Peeler | G06Q 10/067 705/317 |

\* cited by examiner

*Primary Examiner* — Li Wu Chang
(74) *Attorney, Agent, or Firm* — Hunton Andrews Kurth LLP (57) ABSTRACT

The invention relates to a method and system that implements an assessment tool that assesses regulations. The system comprises: a server interface; a data store; and an assessment engine comprising a computer processor, coupled to the server interface and the data store, programmed to: identify a regulation; divide the regulation into a plurality of rules; convert each rule into a question, test and one or more conditions; present, via a user interface, a first question to a user; receive, via the user interface, a response to the first question; store, in the data store, the response; present, via the user interface, a subsequent question responsive to the response; store, in the data store, the subsequent question and corresponding response; and dynamically generate an audit trail of each question and answer combination.

18 Claims, 5 Drawing Sheets

| 410 | Sample Question 1 |
|---|---|
| | Is the asset a Car, Boat, or Plane?  Plane |

| 412 | Sample Question 2 |
|---|---|
| | What is the yearly cost to maintain the asset?  20000 <br> Note that costs subject to this regulation include hangers and airworthiness |

| 414 | Sample Question 3 |
|---|---|
| | How many hours are placed on the engine/airframe per year? The regulation allows deduction of hours for charitable service.  500 |

CANCEL ASSESSMENT   BACK  NEXT  CLOSE

Figure 4

| Item ID | Assessment ID | Item Sequence | Question | Response |
|---|---|---|---|---|
| 21498153 | 2527201 | 1 | Is the asset a Car, Boat, or Plane? | Plane |
| 21498154 | 2527201 | 2 | What is the yearly cost to maintain the asset? Note that costs subject to this regulation include hangers and airworthiness | 20000 |
| 21498155 | 2527201 | 3 | How many hours are placed on the engine/airframe per year? The regulation allows deduction of hours for charitable service. | 500 |

Figure 5

SYSTEM AND METHOD FOR IMPLEMENTING AN ASSESSMENT TOOL

FIELD OF THE INVENTION

The invention relates generally to an assessment tool, and more particularly to a system and method that assesses regulations through a user interface that stores outputs and inputs in a dynamic manner.

BACKGROUND OF THE INVENTION

Regulations generally refer to government requirements, restrictions and guidelines that are imposed on an industry. Regulations are complex and affect various aspects of an organization or business. Because of the complexity, users within an organization may interpret and apply regulations and policies in an inconsistent manner. Oftentimes, an organization will be expected to comply with different regulations and policies. As a result, an organization faces many challenges in complying with a wide range of regulations in a consistent manner.

These and other drawbacks currently exist.

SUMMARY OF THE INVENTION

According to one embodiment, the invention relates to a computer implemented system that assesses regulations. The assessment system comprises: a server interface configured to receive inputs from a user interface; a data store that stores questions, answer and an order associated with the questions and answer; and an assessment engine comprising a computer processor, coupled to the server interface and the data store, programmed to: identify a regulation; divide the regulation into a plurality of rules; convert each rule into a question, test and one or more conditions; present, via the user interface, a first question to a user; receive, via the user interface, a response to the first question; store, in the data store, the response; present, via the user interface, a subsequent question responsive to the response; store, in the data store, the subsequent question and corresponding response; and dynamically generate an audit trail of each question and answer combination.

The system may include a specially programmed computer system comprising one or more computer processors, mobile devices, electronic storage devices, and networks.

The invention also relates to computer implemented method that assesses regulations. The method comprises the steps of: identifying a regulation; dividing the regulation into a plurality of rules; converting each rule into a question, test and one or more conditions; presenting, via a user interface, a first question to a user; receiving, via the user interface, a response to the first question; storing, in a data store, the response; presenting, via the user interface, a subsequent question responsive to the response; storing, in the data store, the subsequent question and corresponding response; and dynamically generating an audit trail of each question and answer combination.

The computer implemented system, method and medium described herein provide unique advantages to organizations, such as financial institutions and other entities. Regulations that impact how the firm manages its credit risk are increasingly complex. When the regulations are applied they need to be applied consistently, with a sufficient audit trail or logic path to evidence the correct application. They also need to be presented in a clear and concise manner and further adaptable to changes in the regulation. An embodiment of the present invention is directed to an assessment system that assesses policies and associated complexities through a user interface that stores the outputs as well as the inputs in a dynamic manner as the user interacts with the system. The policies may be specific to a financial institution, e.g., credit risk policy, as well as other industries, sectors and applications.

The various embodiments of the present invention achieve key improvements over current systems. For example, the innovative assessment tool is able to determine a minimum number of questions to be answered through a user interface, thereby optimizing the resources required to support an assessment process. The distribution of computation from server logic to the user interface component allows for more efficient processing by utilizing the user's desktop computation resources. This allows for greater scalability. Also, an embodiment of the present invention allows for a logic path to be changed quickly which gives the ability to quickly adapt to changing requirements. For example, if the logic and the presentation required to make that logic usable to the end user had to be changed then the release would take significantly longer. According to an embodiment of the present invention, because only the logic path needs to be changed, the effort required to implement may be significantly reduced. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to an assessment tool that takes complexities in regulations or policies and presents the complex information in a format that may be interpreted and usable to a wide range of users with varying abilities to properly understand and interpret policies. The assessment tool enables an organization to consistently apply complex policies and provide visibility as to how users within an organization are making decisions. The assessment tool provides a series of questions via a user interface in a manner that minimizes misinterpretation and reduces incorrect implementation of policies. The user interface dynamically records the questions and corresponding answers throughout the interactive process and provides insights and understanding as to how each user makes a decision. In other words, the assessment tool illustrates a logic path for each user in rendering a decision and coming to a conclusion. The data may also be used to provide constructive feedback to regulators as well as to an internal group within the organization. The feedback may include, for example, why some rules did not apply or did not work within a certain context. The data may be processed and analyzed to identify and develop trends, results, performance indicators, action items and other analysis. For example, the data may be used for trend analysis and also for bifurcating a portfolio in various components depending in the logic to achieve an outcome. Also, the assessment tool may provide analysis on trend events that may be driven by different regulations and other requirements. Accordingly, the assessment tool is dynamic and provides consistency in multiple uses across an organization.

An embodiment of the present invention is directed to converting a policy or regulation into a series of questions that represent a decision tree that may be developed in real time and further changed, modified and/or updated in real time. The decision tree may represent various paths to an output or determination. A particular path for a user may be dynamically captured, stored and analyzed.

An embodiment of the present invention is directed to an assessment process that breaks a regulation into a series of rules. These rules may contain a question in plain English, a test, and one or more conditions that are required to be true in order for the rule to be executed, and one or more conditions that are true depending on the result entered by the user. According to an embodiment of the present invention, these rules may be executed from a user interface that feeds the user questions and then takes the response, renders this dynamically to present the next question. For example, the rules may directly impact what is presented to the user, via the user interface.

According to an embodiment of the present invention, the assessment process breaks the regulation into a decision tree that is expressed in English. The intermediate questions and/or answers may be stored in a memory component (e.g., data store) so that an audit trail may be preserved. The nature of a rules engine allows for easier maintenance. Also, a decision tree allows for review and reporting to ensure that the regulations are applied and interpreted consistently. An embodiment of the present invention may be applied to a broad policy that may then be focused based on input and responses from users within an organization.

An embodiment of the present invention automatically codes the rules in a rules format which may then be used to dynamically interact with a user, via the user interface.

The assessment tool may be applied to policies, regulations as well as other types requirements, restrictions, guidelines, etc. The assessment tool may be applied to various sectors, including financial, government, consumer products, environmental, and others.

The features of the various embodiments of the present invention provide benefits and improvements over current systems. For example, by organizing as a decision tree, the adoption of rules with the format of pre-conditions, question, test, and post-conditions allows for the business subject matter experts to define the requirements which puts the definition directly in the hands of the subject matter expert (SME).

By defining the user interface to take the question text from the rule, the rules may be dynamically presented to a user in a usable format. An embodiment of the present invention couples the dynamic user interface to a rules engine using direct SME input. Also, the results may be saved as a secondary function which preserves the audit trail for later analysis. Selection of the rules engine also allows for faster changes because the relationships between the rules may be determined at run-time and does not need to be explicitly coded.

The user interface of an embodiment of the present invention may be designed so that it is driven by the rules engine itself and assumes a structure according to the rules executed. That same structure may be exposed to the business SMEs that may be used to breakdown the regulation into a decision tree.

With increasing complexity of regulation, an embodiment of the present invention may be implemented to give users the ability to navigate the policy in a straight-forward way. Past experience shows that regulations are more likely to grow more numerous and more complex. The various features of an embodiment of the present invention provide a way to manage this growing complexity.

In addition, an embodiment of the present invention provides results that are consistent by enforcing a consistent set of controls on each assessment. The ability to record each question in order provides data for later reporting to ensure proper adherence to any constraints around the assessment.

Figure 1:
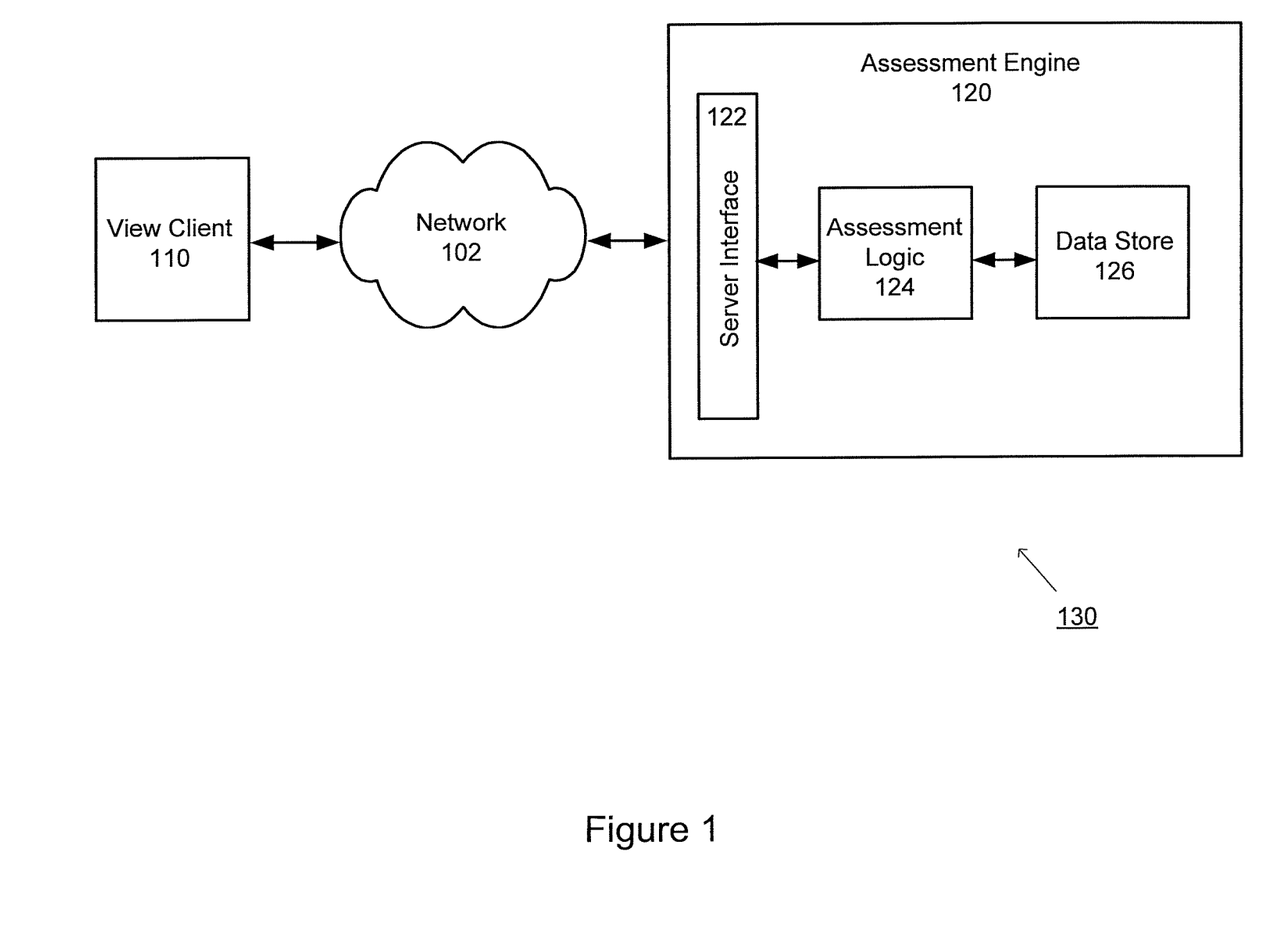
FIG. 1 illustrates a schematic diagram of a system that implements an assessment tool, according to an exemplary embodiment.

FIG. 1 illustrates a schematic diagram of a system that implements an assessment tool, according to an exemplary embodiment. According to an embodiment of the present invention, there are two main components to the Assessment application, namely, a user interface, e.g., View Client 110, and an Assessment Engine 120. View Client 110 may accept user input and in response, render responses from Assessment Engine 120. Assessment Engine 120 may determine the next question based on the prior responses given by the user. Each question and a corresponding answer may be stored along with an order in which the questions were asked and answered for later data analysis. In addition, intermediate tests may be applied to the user input and those results may be stored as well. The user interface of an embodiment of the present invention may interpret responses from Assessment Engine 120 and then render a next question as instructed without the need for static instructions to render a user interface in a web browser or other user interface technology. Once the assessment has concluded, the culmination of the user input and tests may be provided to the user for confirmation and/or approval (i.e., accept or reject).

View Client 110 may accept user input and render the responses from Assessment Engine 120. Assessment Engine 120 may determine the path of questions and the assessment results based on the user inputs. The Assessment Engine may include a customized data store 126.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

As illustrated in FIG. 1, network 102 may be communicatively coupled with one or more data devices including, for example, computing devices associated with users that host View Client 110. Such devices may include mobile devices, including mobile phones, smart devices, a laptop computer, a personal digital assistant, a smartphone, a smartwatch, smart glasses, other wearables or other computing devices capable of sending or receiving network signals. Network 102 may communicate with Assessment Engine 120 through Server Interface 122, which may be hosted by various entities, represented by 130. Entity 130 may include an Assessment Engine 120 that determines the path of questions and the assessment results based on user inputs. Assessment Logic 124 may determine questions to present to View Client 110 based on questions stored in Data Store 126 and answers provided through View Client 110. Data Store 126 may store the questions, answers and a corresponding order as well as intermediate results. The Assessment Engine features described herein may be provided by Entity 130 and/or a third party provider, which may operate with Entity 130.

The system of FIG. 1 may be implemented in a variety of ways. Architecture within system may be implemented as hardware components (e.g., module) within one or more network elements. It should also be appreciated that architecture within system may be implemented in computer executable software (e.g., on a tangible, non-transitory computer-readable medium) located within one or more network elements. Module functionality of architecture within system may be located on a single device or distributed across a plurality of devices including one or more centralized servers and one or more mobile units or end user devices. The architecture depicted in system is meant to be exemplary and non-limiting. For example, while connections and relationships between the elements of system is depicted, it should be appreciated that other connections and relationships are possible. The system described below may be used to implement the various methods herein, by way of example. Various elements of the system may be referenced in explaining the exemplary methods described herein.

While FIG. 1 illustrates individual devices or components, it should be appreciated that there may be several of such devices to carry out the various exemplary embodiments.

The network 102 may be a wireless network, a wired network or any combination of wireless network and wired network. For example, the network 102 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network 102 may support an Internet network, a wireless communication network, a cellular network, Bluetooth, or the like, or any combination thereof. The network 102 may further include one, or any number of the exemplary types of networks mentioned above operating as a stand-alone network or in cooperation with each other. The network 102 may utilize one or more protocols of one or more network elements to which it is communicatively coupled. The network 102 may translate to or from other protocols to one or more protocols of network devices. Although the network 102 is depicted as one network for simplicity, it should be appreciated that according to one or more embodiments, the network 102 may comprise a plurality of interconnected networks, such as, for example, a service provider network, the Internet, a cellular network, corporate networks, or even home networks, or any of the types of networks mentioned above.

Data may be transmitted and received via network 102 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

Entity 130 may include or be communicatively coupled to Data Store 126. For example, Data Store 126 may store the questions, answers and a corresponding order, etc. Data Store 126 may include any suitable data structure to maintain the information and allow access and retrieval of the information. For example, Data Store 126 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Data Store 126 may be any suitable storage device or devices. The storage may be local, remote, or a combination thereof with respect to Data Store 126. Data Store 126 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Data Store 126 may have back-up capability built-in. Communications with Data Store 126 may be over a network, such as network 102, or communications may involve a direct connection between Data Store 126 and Entity 130, as depicted in FIG. 1. Data Store 126 may also represent cloud or other network based storage.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Figure 2:
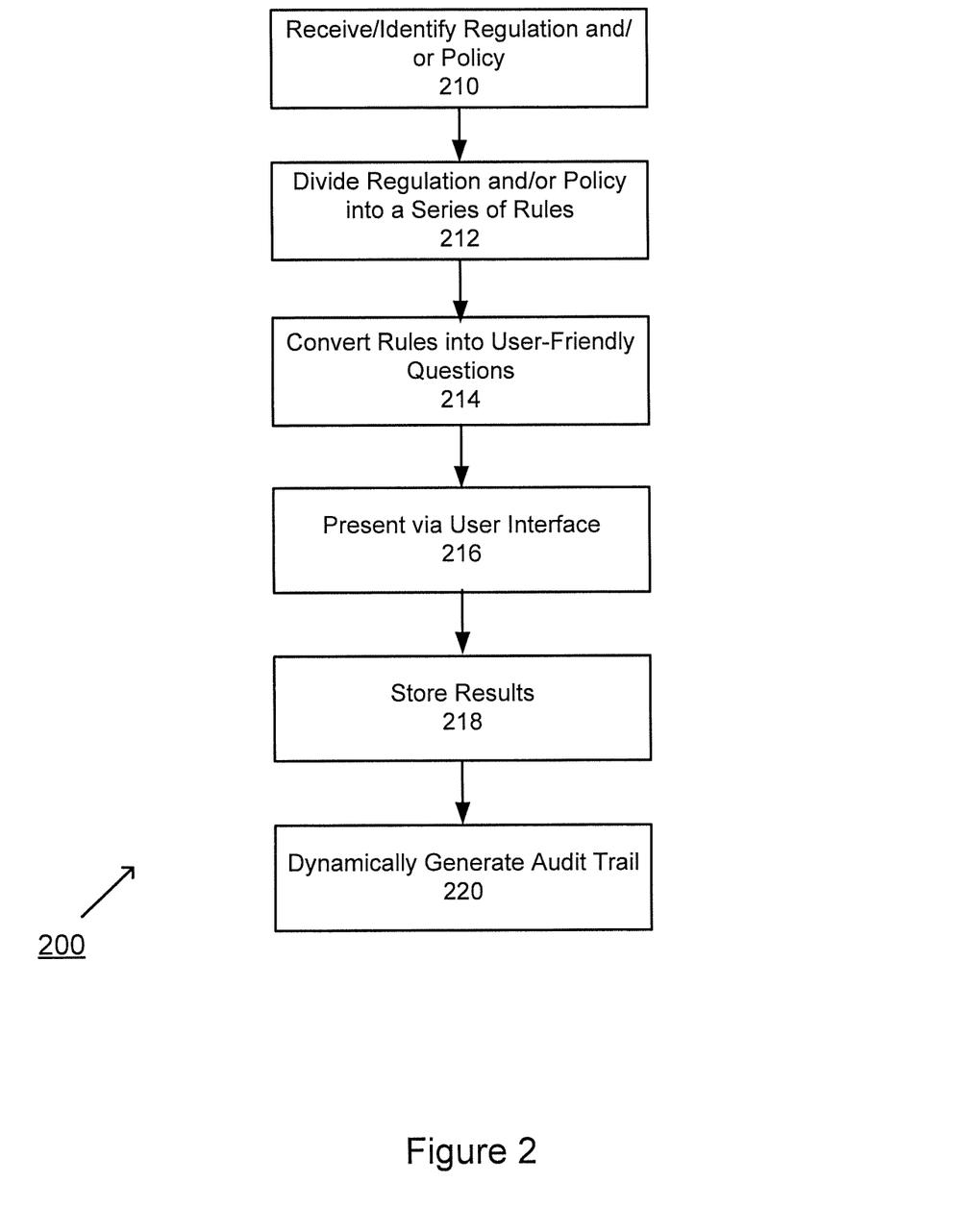
FIG. 2 is an exemplary flowchart of a method for implementing an assessment tool, according to an embodiment of the present invention.

FIG. 2 is an exemplary flowchart of a method for implementing an assessment tool, according to an embodiment of the present invention. At step 210, a regulation or policy may be received or identified. At step 212, the regulation or policy may be divided into a series of rules. At step 214, the rules may be converted into a set of questions. At step 216, the user may be presented with the set of question, via a user interface. At step 218, user interaction data and results may be stored. At step 220, an audit trail may be automatically generated. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, a regulation may be received or identified. The regulation may be a government regulation or policy. For example, a banking regulation may require banks to comply with regulations, restrictions and guidelines. Other policies that relate to various industries may be identified.

At step 212, the regulation may be divided into a series of rules. The series of rules may be based on categorization of the regulation or policy. For example a regulation may be divided into various categories which may be applied consistently and transparently.

At step 214, the rules may be converted into a set of questions. Each rule may have a corresponding question or set of questions, test and one or more conditions. For example, the regulation may be converted into a decision tree with a series of questions expressed in a user friendly easily-understandable format.

At step 216, the user may be presented with the set of question, via a user interface. The assessment tool may provide the set of questions to a user and receive responses where the responses may be used to generate a next question. The process may repeat for each question and answer sequence.

At step 218, the results may be stored in a data store or other memory component. For example, user answers and interaction data may be stored. Also, intermediate questions and/or answers may be stored in a memory component (e.g., data store) so that an audit trail may be preserved.

At step 220, an audit trail may be automatically generated. For example, the audit trail may include a corresponding logic path for each user in rendering a decision and coming to a conclusion. The data may also be used to provide constructive feedback to regulators as well as to an organization.

An embodiment of the present invention is directed to converting a policy or regulation into a series of questions that represent a decision tree that may be developed in real time and further changed, modified and/or updated in real time. The decision tree may represent various paths to an output or determination. A particular path for a user may be dynamically captured, stored and analyzed.

Figure 3:
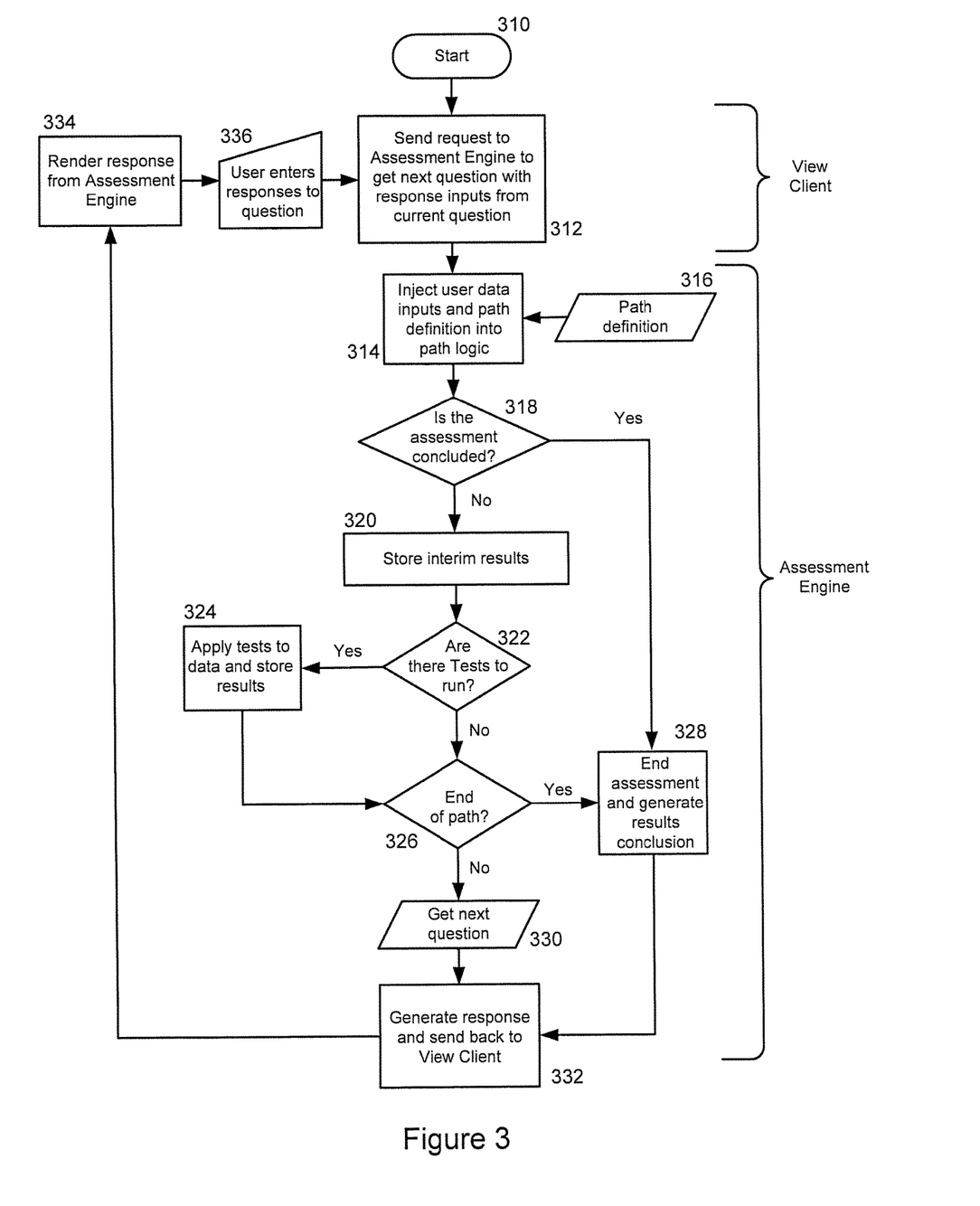
FIG. 3 is an exemplary flowchart of a method for implementing an assessment tool, according to an embodiment of the present invention.

FIG. 3 is an exemplary flowchart of a method for implementing an assessment tool, according to an embodiment of the present invention. View Client 110 sends a request to Assessment Engine 120 to start an assessment. Assessment Engine 120 may determine a starting question for the type of assessment requested and send a response back to View Client 110 with the question details. View Client 110 may render the response as text and a set of user input controls by direct instruction to the user interface technology via its native runtime Application Programming Interface (API). The assessment process may be iterative with the following steps repeated until the assessment results are derived.

An assessment process starts at step 310. At step 312, a request is sent to an Assessment Engine to retrieve a next question with response inputs from a current question. The user enters in the data inputs to the question and requests the next question. At step 314, user data inputs and a path definition may be injected into a path logic. Path definition may be retrieved from step 316. For example, path definition may be retrieved or accessed from a configuration file or other source. The configuration file may be stored at a database or other storage mechanism. At step 318, the process may determine if the assessment has concluded. If yes, the assessment ends and results are generated at step 328. If no, interim results may be stored at step 320. At step 322, the process may determine whether there are tests to run. If yes, tests may be applied to the data and the results may be stored at step 324. If no, the process may determine whether the end of the path has been reached, at step 326. If the end has been reached, the assessment process ends and results are generated at step 328. If no, a next question may be retrieved at step 330. At step 332, responses may be generated and sent back to View Client. At step 334, responses may be rendered from Assessment Engine. At step 336, user may then enter responses to a current question. The user may enter information or elect to move backward in the assessment and invalidate a question that has already been answered. The process may then repeat from step 310. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
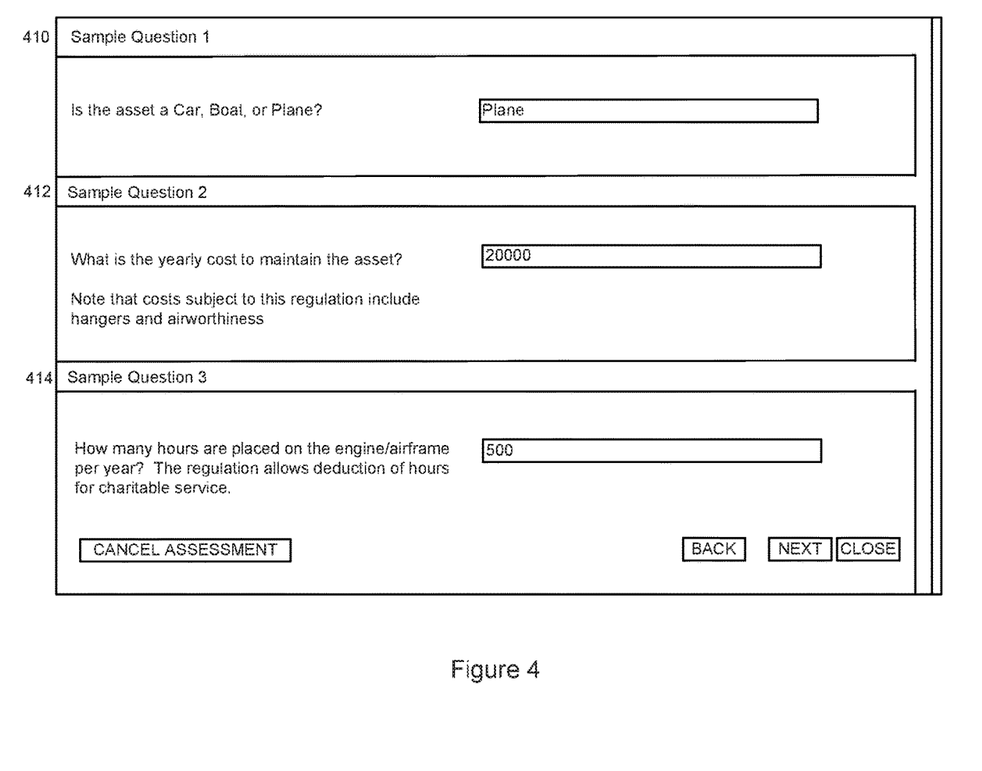
FIG. 4 is an exemplary screen shot that illustrates an assessment engine interface, according to an embodiment of the present invention.

FIG. 4 is an exemplary screen shot that illustrates an assessment tool, according to an embodiment of the present invention. FIG. 4 is an exemplary user interface where a set of questions may be presented to the user. The exemplary user interface has a plurality of sections. In the example shown in FIG. 4, there are three sections, sample question 1 at 410, sample question 2 at 412 and sample question 3 at 414.

Figure 5:
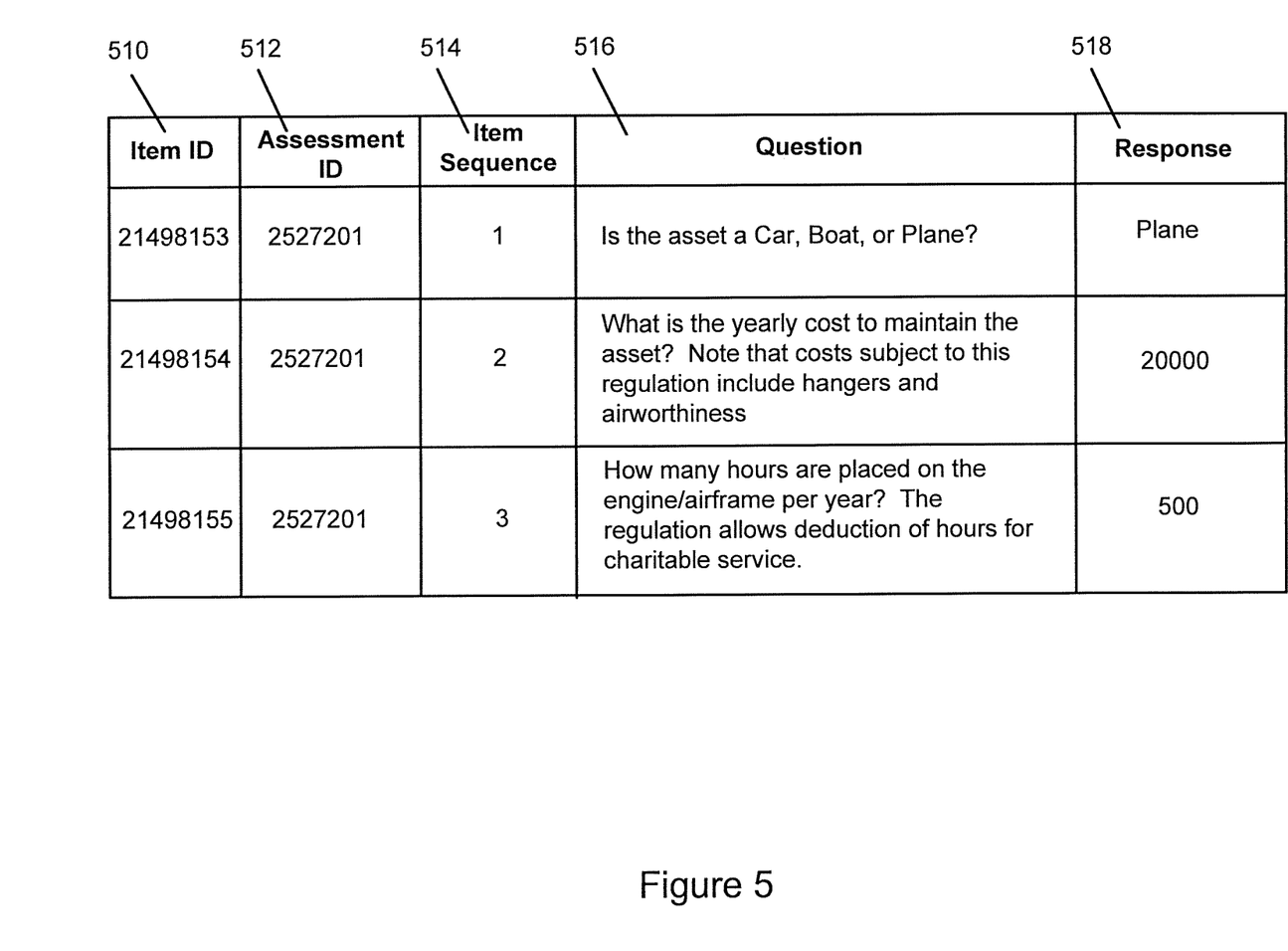
FIG. 5 is an exemplary audit trail, according to an embodiment of the present invention.

FIG. 5 is an exemplary audit trail, according to an embodiment of the present invention. The audit trail illustrated in FIG. 5 corresponds the interaction illustrated in FIG. 4. In this example, the audit trail may include Item ID, at 510; Assessment ID, at 512; Item Sequence at 514; Question at 516 and Response at 518. Other fields and variations may be implemented.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, FIG. 1 includes a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. An assessment system that assesses regulations, the assessment system comprising:
a server interface configured to receive inputs from a user interface;
a data store that stores questions, answer and an order associated with the questions and answer; and
an assessment engine comprising a computer processor, coupled to the server interface and the data store, programmed to:
identify a regulation;
divide the regulation into a plurality of rules;
convert each rule into a question, test and one or more conditions;
present, via the user interface, a first question to a user related to the identified regulation;
receive, via the user interface, a natural language response to the first question;

store, in the data store, the response to the first question as well as user interaction data related to the response to the first question;

determine, via the processor, a path of questions and one or more resulting user feedback based on the response to the first question, wherein this determination constitutes the determination of a logic path;

present, via the user interface, a subsequent question responsive to the response to the first question and based on the determined logic path;

receive, via the user interface, a natural language response to the subsequent question;

store, in the data store, the subsequent question and the response to the subsequent question, as well as user interaction data related to the response to the subsequent question;

update, via the processor, the logic path of questions and results based on the response to the subsequent question; and dynamically generate an audit trail of each question, answer, and user interaction data combination, as well as feedback related to the logic path created by the user's answers and interaction data.

2. The system of claim 1, wherein the regulation is a banking regulation for credit risk.

3. The system of claim 1, wherein the assessment engine is programmed to execute an intermediate test and store corresponding results in the data store.

4. The system of claim 1, wherein the assessment engine is programmed to identify trend analysis.

5. The system of claim 1, wherein each rule is automatically coded.

6. The system of claim 1, wherein the question is part of a series of questions that represent a decision tree that is generated in real time.

7. The system of claim 6, wherein the decision tree represents a plurality of paths to a determination reached by a user.

8. The system of claim 1, wherein the rules are dynamically presented via the user interface using direct Subject Matter Expert (SME) input.

9. The system of claim 1, wherein relationships between the rules is determined at run-time.

10. A method that assesses regulations, the method comprising the steps of:
identifying a regulation;
dividing the regulation into a plurality of rules;
converting each rule into a question, test and one or more conditions;
presenting, via a user interface, a first question to a user;
receiving, via the user interface, a natural language response to the first question;
storing, in a data store, the response to the first question as well as user interaction data related to the response to the first question;
determining a path of questions and one or more resulting user feedback based on the response to the first question, wherein this determination constitutes the determination of a logic path;
presenting, via the user interface, a subsequent question responsive to the response to the first question and based on the determined logic path;
receiving, via the user interface, a natural language response to the subsequent question;
storing, in the data store, the subsequent question and the response to the subsequent question, as well as user interaction data related to the response to the subsequent question;
updating the logic path of questions and results based on the response to the subsequent question; and
dynamically generating an audit trail of each question, answer, and user interaction data combination, as well as feedback related to the logic path created by the user's answers and interaction data.

11. The method of claim 10, wherein the regulation is a banking regulation for credit risk.

12. The method of claim 10, further comprising the step of executing an intermediate test and store corresponding results in the data store.

13. The method of claim 10, further comprising the step of identifying trend analysis.

14. The method of claim 10, wherein each rule is automatically coded.

15. The method of claim 10, wherein the question is part of a series of questions that represent a decision tree that is generated in real time.

16. The method of claim 15, wherein the decision tree represents a plurality of paths to a determination reached by a user.

17. The method of claim 10, wherein the rules are dynamically presented via the user interface using direct SME input.

18. The method of claim 10, wherein relationships between the rules is determined at run-time.

* * * * *